United States Patent [19]
Schneider

[11] Patent Number: 5,987,883
[45] Date of Patent: Nov. 23, 1999

[54] METHOD OF DIAGNOSING A CATALYTIC CONVERTER

[75] Inventor: Erich Schneider, Kirchheim, Germany

[73] Assignee: Robert Bosch GmbH, Stuttgart, Germany

[21] Appl. No.: 08/873,292

[22] Filed: Jun. 11, 1997

[30] Foreign Application Priority Data

Jun. 12, 1996 [DE] Germany .................... 196 23 335

[51] Int. Cl.$^6$ ........................................ F01N 3/00
[52] U.S. Cl. ...................... 60/274; 60/277; 73/118.1
[58] Field of Search ................ 60/274, 276, 277, 60/285; 73/118.1

[56] References Cited

U.S. PATENT DOCUMENTS

| | | |
|---|---|---|
| 4,622,809 | 11/1986 | Abthoff et al. . |
| 5,228,287 | 7/1993 | Kuronishi et al. ............ 60/276 |
| 5,335,538 | 8/1994 | Blischke et al. ............ 73/118.1 |
| 5,404,718 | 4/1995 | Orzel et al. ............ 60/274 |
| 5,602,737 | 2/1997 | Sindano et al. ............ 60/285 |

FOREIGN PATENT DOCUMENTS

| | | |
|---|---|---|
| 0492165 | 7/1992 | European Pat. Off. . |
| 0589169 | 3/1994 | European Pat. Off. . |
| 3830515 | 3/1990 | Germany . |
| 4441432 | 5/1996 | Germany . |
| WO 93/03358 | 2/1993 | WIPO . |

Primary Examiner—Thomas E. Denion
Attorney, Agent, or Firm—Walter Ottesen

[57] ABSTRACT

The invention is directed to a method for evaluating the operability of a catalytic converter mounted in the exhaust-gas system of an internal combustion engine. In the method, the actual value of a signal of an exhaust-gas probe mounted downstream of the catalytic converter is detected and an expectation value of the signal of the exhaust-gas probe is formed from quantities measured upstream of the catalytic converter. A measure is formed for the deviation of the actual value from the expectation value and the operability of the catalytic converter is evaluated on the basis of the measure.

13 Claims, 6 Drawing Sheets

METHOD OF DIAGNOSING A CATALYTIC CONVERTER

FIELD OF THE INVENTION

The invention relates to a method of diagnosing a catalytic converter which is used to convert toxic substances in the exhaust gas of internal combustion engines.

BACKGROUND OF THE INVENTION

Statutory requirements provide for an onboard diagnosis of motor vehicle components such as catalytic converters which are relevant for toxic substance emissions. In this context, U.S. Pat. No. 4,622,809 discloses applying the signal amplitude of an exhaust-gas probe to evaluate the state of the catalytic converter. The exhaust-gas probe is sensitive to oxygen and is mounted rearward of the catalytic converter. The known method is based on the averaging effect with which the catalytic converter operates on the oxygen content in the exhaust gas. If the exhaust gas flowing into the catalytic converter is rich in oxygen, then the catalytic converter can store excess oxygen within certain limits and release the oxygen when the exhaust-gas entry is deficient in oxygen. An oscillation of the oxygen content in the exhaust gas forward of the catalytic converter is therefore attenuated by the catalytic converter, that is, the amplitude of the oscillation is reduced. The oscillation of the oxygen content in the exhaust gas typically takes place in a known strategy for the control of the air/fuel ratio for an internal combustion engine.

If the exhaust-gas probe, which is mounted rearward of the catalytic converter, registers an unexpectedly intense oscillation of the oxygen content, this is evaluated as an indication of a defective catalytic converter because a loss of the toxic substance conversion capability accompanies the loss of the attenuating effect.

SUMMARY OF THE INVENTION

It is an object of the invention to provide a catalytic converter diagnostic method having a reliability which is further improved with respect to the safety and reproducibility of the diagnostic statements obtained.

The method of the invention is for evaluating the operability of a catalytic converter mounted in the exhaust-gas system of an internal combustion engine. The method includes the steps of: detecting the actual value of a signal of an exhaust-gas probe mounted downstream of the catalytic converter; forming an expectation value of the signal of the exhaust-gas probe from quantities measured upstream of the catalytic converter; forming a measure for the deviation of the actual value from the expectation value; and, evaluating the operability of the catalytic converter on the basis of the measure.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
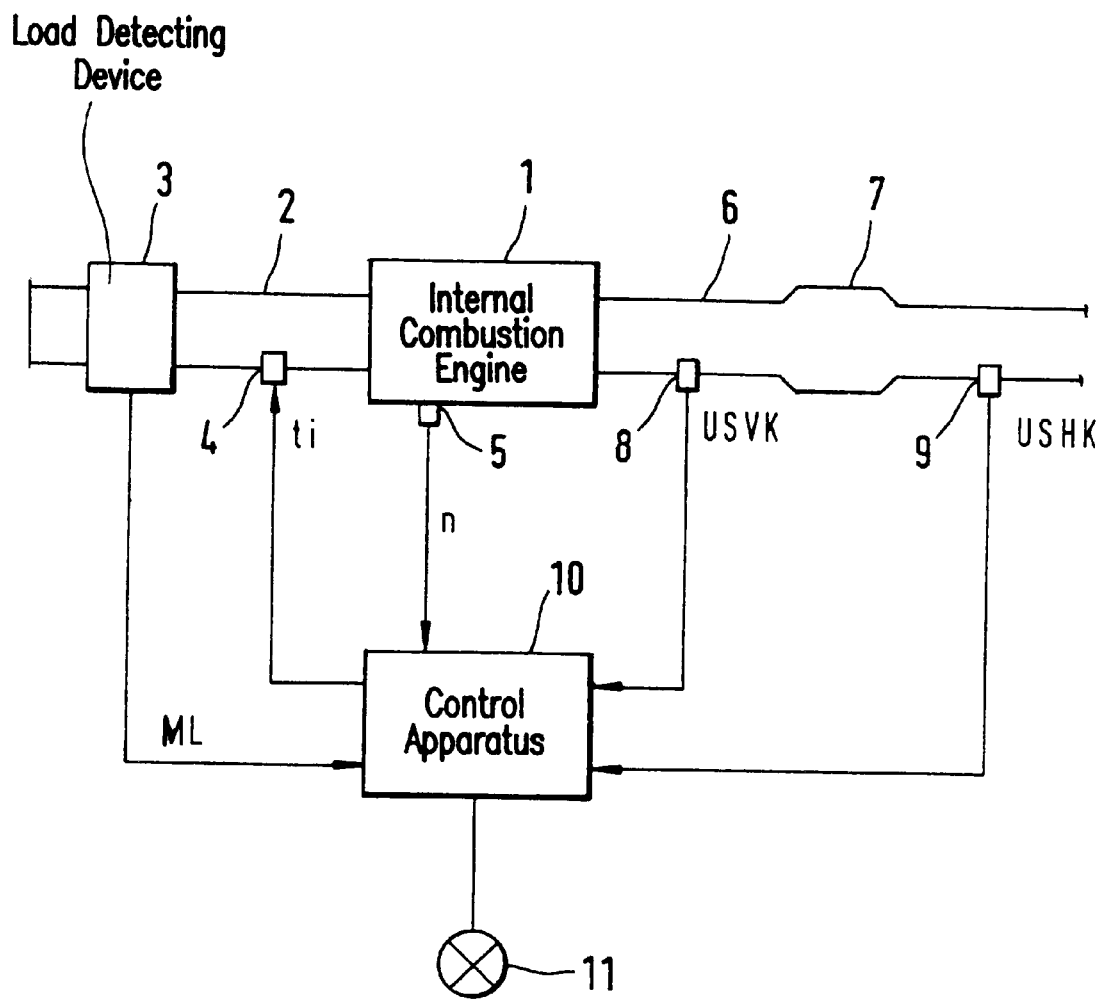
FIG. 1 is a block diagram showing the technical background within which the method of the invention is applied.

FIG. 1 shows an internal combustion engine 1 having an intake pipe 2, a load detecting device 3, a fuel metering means 4, an rpm sensor 5, an exhaust-gas system 6, a catalytic converter 7, exhaust-gas probes 8 and 9, a control apparatus 10 and a means 11 for displaying an error.

The control apparatus 10 receives the signals ML of the load-detecting means, (n) of the rpm sensor and the signals USVK and USHK of the two exhaust-gas probes and forms therefrom, inter alia, a fuel metering signal ti such as a fuel injection pulsewidth for driving injection valves 4 as fuel-metering means. For this purpose, a base value tl of the drive signal ti is determined for the fuel metering means as a function of the inducted air mass ML and the rpm (n). This base value is multiplicatively corrected via a control positioning variable FR which, in a manner known per se, is generated by applying a PI control strategy to the deviation of the probe signal USVK from a desired value. In the formation of the fuel metering signal, the signal USHK can be included additionally, for example, for the formation of a desired value.

Figure 2:
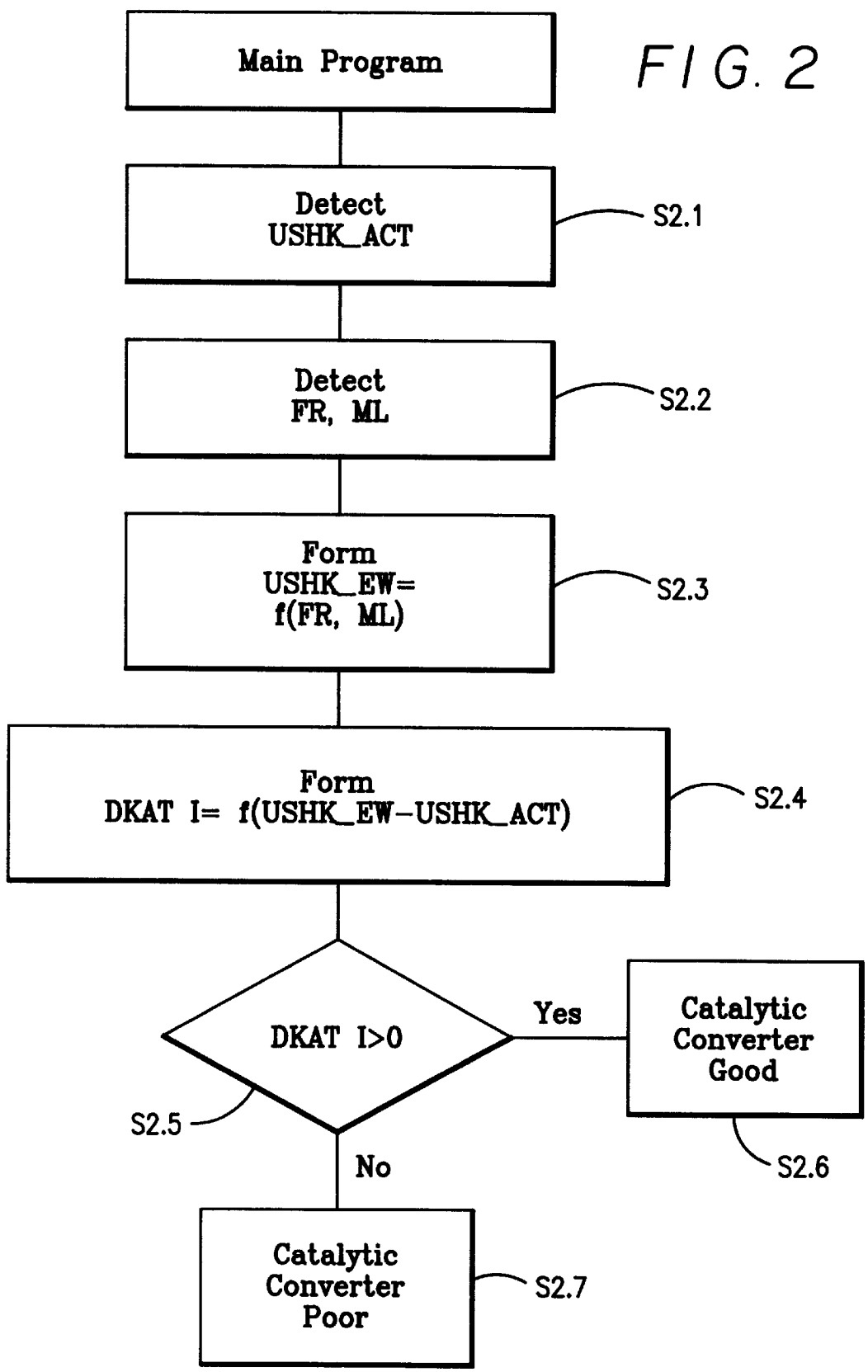
FIG. 2 shows an embodiment of the method of the invention in the context of a flowchart.

In this context, the embodiment of the method of the invention shown in FIG. 2 can be carried out. A step S2.1 is accessed from a higher-ranking engine control or main program. In step S2.1, the actual value USHK-ACT of the exhaust-gas probe mounted downstream of the catalytic converter is detected. Step S2.2 serves to detect quantities which influence the oxygen entry into the catalytic converter. These quantities can be measured upstream of the catalytic converter. For example, those quantities are the inducted air mass ML and the control positioning variable FR.

From the quantities detected in step S2.2, an expectation value USHK-EW is computed for the signal of the exhaust-gas probe mounted downstream of the catalytic converter. The basis for the formation of the expectation value is the (hypothetical) influence of a catalytic converter which can be evaluated as being just still good. Thereafter, in step S2.4, the formation of the catalytic converter evaluation quantity DKAT I takes place as a function of the difference of the expectation value USHK-EW and the actual value USHK-ACT. If the catalytic converter is still better than the model catalytic converter which is just still good and which forms the basis of the formation of the expectation value, then the actual values are less than the expectation values. Under the precondition that the DKAT I formation has the sign of the difference USHK-EW–USHK-ACT, the catalytic converter is evaluated in step S2.6 as good when DKAT I in step S2.5 is positive. If, in contrast, DKAT I is negative, then the catalytic converter is evaluated in step S2.7 as being poor and, if required, the means 11 from FIG. 1 is activated which shows this state. Stated otherwise, the catalytic converter is evaluated with a method wherein the actual value of the signal of an exhaust-gas probe, which is mounted downstream of the catalytic converter, is detected and wherein an expectation value of the signal of the above-mentioned exhaust-gas probe is formed from the quantities measured upstream of the catalytic converter. A measure for the deviation of the actual value from the expectation value is formed and the operability of the catalytic converter is evaluated on the basis of this measure.

The catalytic converter is then advantageously evaluated as being nonoperational when the measure for the deviation after a pregiven time span exceeds a pregiven threshold value.

Quantities measured upstream of the catalytic converter are used and are advantageously a quantity, which is based on the signal of an exhaust-gas probe mounted forward of the catalytic converter, and a signal, which indicates the mixture quantity inducted by the internal combustion engine.

Values of the difference of the actual and expectation values can be summed (integrated) as a measure for the deviation of the actual value from the expectation value. These values can follow each other sequentially in time.

Figure 3:
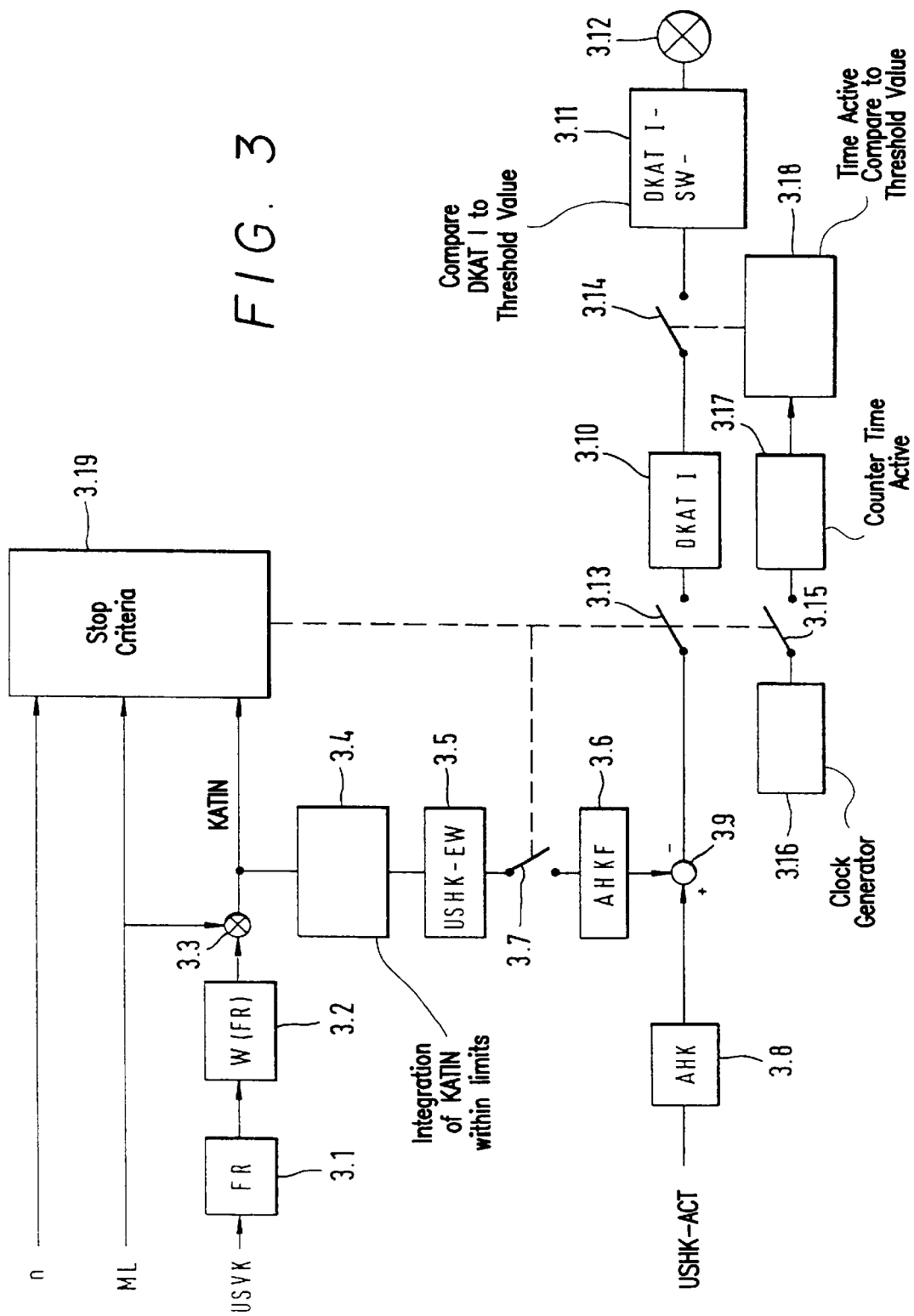
FIG. 3 shows an embodiment of the method of the invention in the form of function blocks; and, FIGS. 4a to 4g show the time-dependent traces of several signals which can be taken off the function block diagram of FIG. 3 at various locations.
Figure 4A:
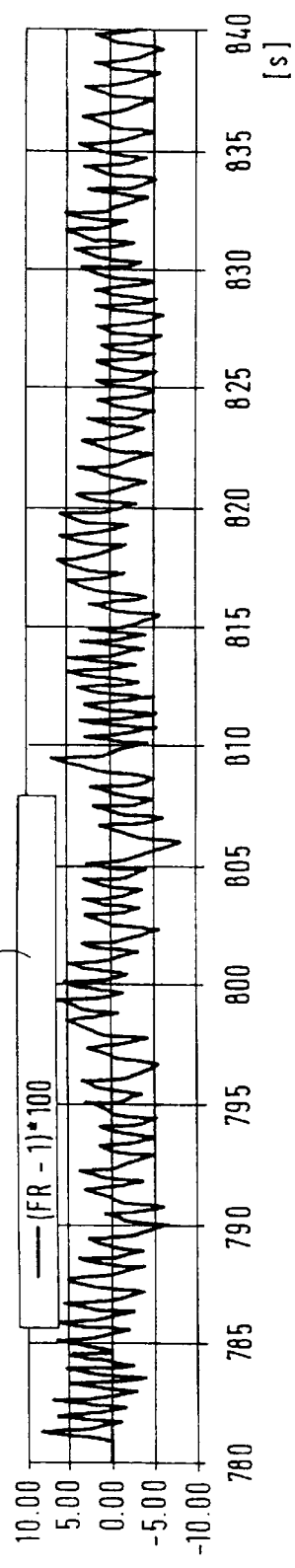
Figure 4B:
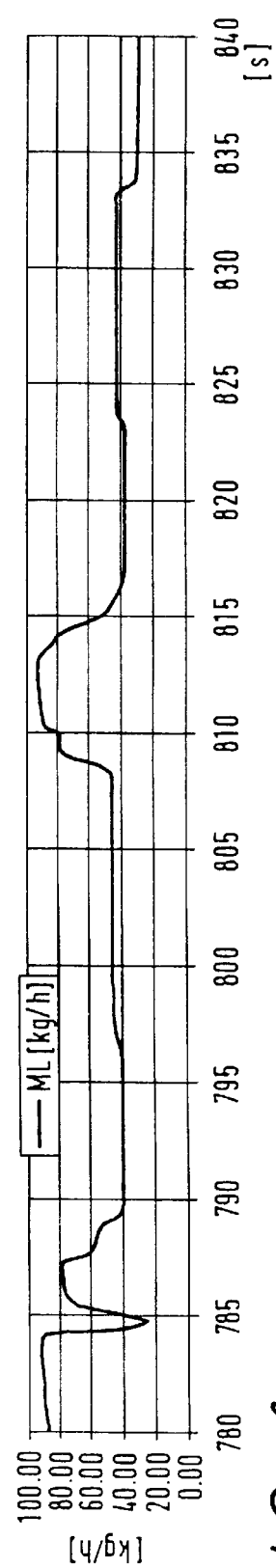
Figure 4C:
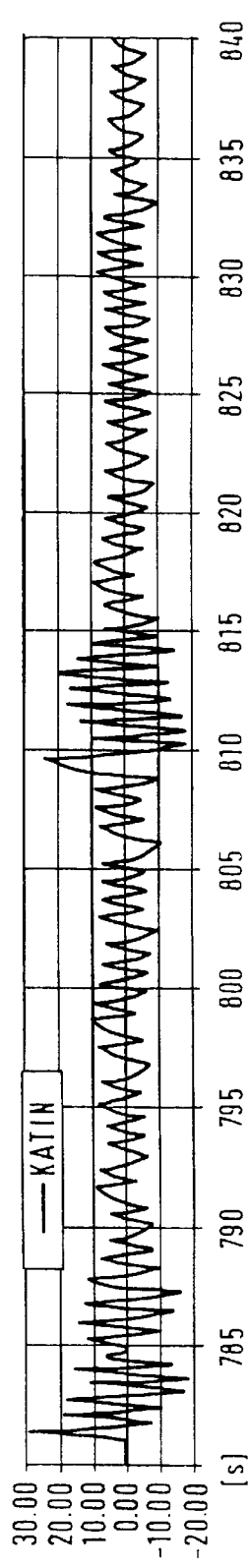

FIG. 3 shows a detailed embodiment of the invention as a function block diagram. In block 3.1, the already-mentioned control position variable FR is formed from the signal USVK of the forward probe. Block 3.2 serves for filtering out the alternating-current component W of the control positioning variable FR. This can take place, for example, by forming the difference of the instantaneous and mean values of the control positioning variable FR. The alternating-current component defines a measure for the oxygen content of the exhaust gas according to its magnitude and sign. A typical trace is shown in FIG. 4a. The quantity KATIN is obtained by multiplication with the inducted air mass ML at the coupling point 3.3. The quantity KATIN is a measure for the positive or negative input of oxygen into the catalytic converter. A trace of ML is shown in FIG. 4b and a trace of the product KATIN is shown in FIG. 4c.

Figure 4D:
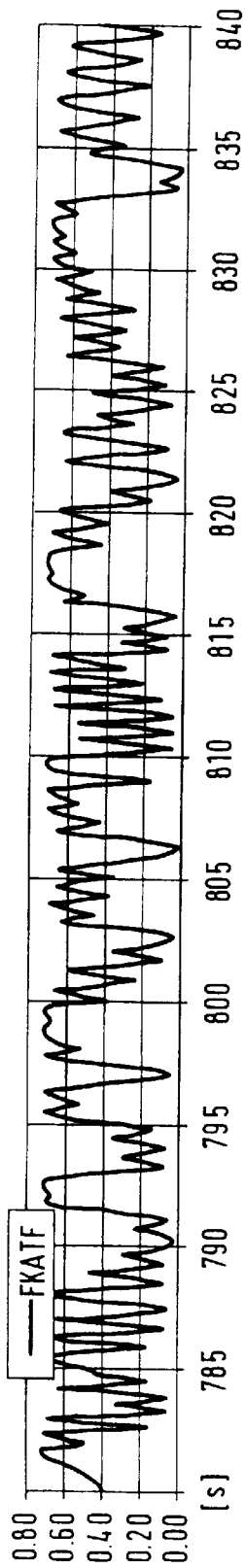

The integration of the quantity KATIN in block 3.4 supplies a measure for the actual oxygen charge level of the catalytic converter. The integration then runs within limits as are typical for a catalytic converter which is still just usable. If such a catalytic converter can, for example, store a quantity X0 of oxygen and if this value is achieved by integration, then the integration result up to reversal of the direction of integration is held constant. In this time, the expectation value USHK-EW for the signal of the exhaust-gas probe, which is mounted rearward of the catalytic converter, remains at a value characteristic for oxygen-rich exhaust gas. The expectation value USHK-EW is formed in step S3.5. The foregoing is so because one must proceed from the condition that the already filled catalytic converter passes additional oxygen input. For a change of sign of FR, KATIN also changes sign and the direction of integration in block 3.4 reverses. If the catalytic converter was previously filled with oxygen, then it will now be emptied. As soon as the integration value represents an empty catalytic converter, then the expectation value USHK-EW in step S3.5 is changed to a value characteristic for oxygen-deficient exhaust gas. The expectation value for the signal USHK-EW is accordingly formed in dependence upon a modelled catalytic converter fill level on the basis of a hypothesis for the catalytic converter state and further on the basis of quantities which can be measured upstream of the catalytic converter. These quantities represent the oxygen input into the catalytic converter. The trace of an expectation value USHK-EW formed in this manner is shown for the signal of the rearward probe in FIG. 4d.

Figure 4E:
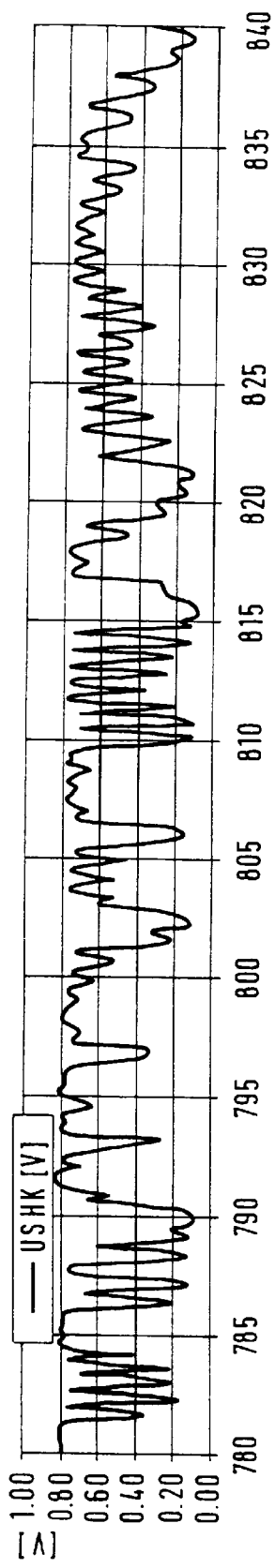

FIG. 4e shows the time-dependent trace of the signal of the probe rearward of the catalytic converter. This signal is recorded under the same conditions. A comparison of both signal traces makes clear the desired similarity of the model-formed expectation value (FIG. 4d) to the measured actual value (see FIG. 4e).

In block 3.6, the amplitude AHKF of the expectation value USHK-EW is determined. The AHKF formation can be interrupted when certain stop conditions are present.

Figure 4F:
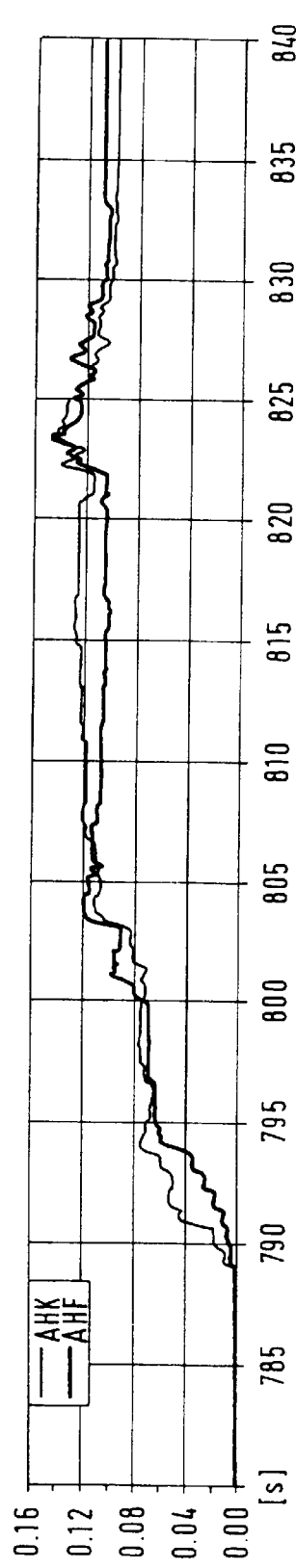

These stop conditions are explained below. The switch 3.7 symbolizes this interruption possibility. In an analog manner, the amplitude AHK of the actual value USHK-ACT is determined in block 3.8. However, no interruptions are provided. The time-dependent traces of both amplitudes are shown in FIG. 4f. The formation starts at a time point t0 and is interrupted when the above-mentioned stop conditions are present.

At point 3.9, a difference formation of the amplitude values takes place. Thereafter, this difference is integrated in block 3.10 and is compared in block 3.11 to a threshold value and closed switches 3.13 and 3.14 are assumed. The fault lamp 3.12 is switched on in dependence upon the result of the comparison.

Figure 4G:
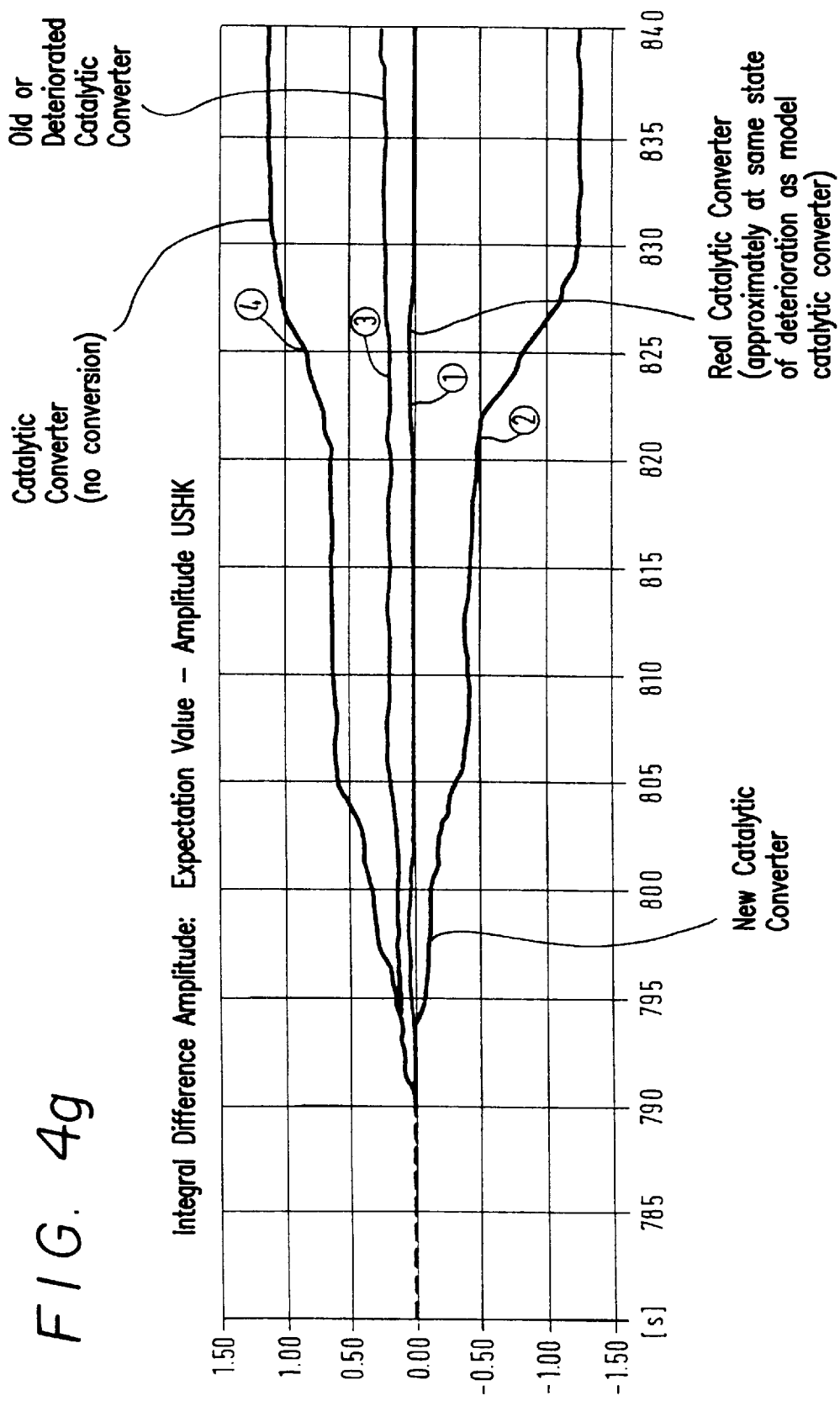

The criteria under which the fault lamp is to be switched on are explained with respect to FIG. 4g which shows the time-dependent trace of the integral of the difference of the expectation value and the actual value for four differently deteriorated catalytic converters.

Line 1 corresponds to a real catalytic converter which is approximately at the same state of deterioration as the model catalytic converter which is the basis of the formation of the expectation value. The difference, and therefore also the integral of the difference, is correspondingly small between the measured actual value and the model-formed expectation value (formed in accordance with a pregiven model). The line 1, which extends in the vicinity of 0, therefore points to a catalytic converter which corresponds to the model catalytic converter and therefore still just satisfies the requirements as to the toxic substance conversion.

Line 2 corresponds to a new catalytic converter which is better than the model catalytic converter. The new catalytic converter attenuates the amplitude of the oscillations in the oxygen content of the exhaust gas to a greater extent than the model catalytic converter. The measured actual values are therefore less than the expectation values so that the difference (actual value—expectation value) is less than 0 for the determination of algebraic sign at point 3.9 of FIG. 3. Stated otherwise, the line 2 runs clearly below the 0 line and points to a catalytic converter which is still good.

Opposite relationships are present for lines 3 and 4 which point to poor catalytic converters. In both cases, the measured actual value is greater than the expectation value which is based on a catalytic converter which is just still acceptable.

From the foregoing, the catalytic converter, which is still good, is separated by a threshold from the catalytic converters which are deteriorated. The threshold runs between the poor and the good catalytic converters. The position of the threshold (for example, the value 0) is dependent upon the sign convention of the point 3.9 in FIG. 3 and of the model taken which forms the basis of the formation of the expectation value. If, for example, a new catalytic converter formed the basis of the formation of the expectation value, then a trace in the proximity of zero would result only for a new catalytic converter. The degree of deterioration would in this case be measured from the spacing of the measured traces to the zero line. However, all lines would run above the zero line.

In the presentation up to now, a through signal path between the subtraction point 3.9 and the fault lamp 3.12 is assumed which corresponds to closed switches 3.13 and 3.14 (or switches which are not present).

To further increase the reliability and reproducibility of the diagnostic statements, the function of the switches 3.13 to 3.15 in combination with the blocks 3.16 to 3.19 is of special advantage. The function of this arrangement comprises interrupting the diagnostic function when certain stop criteria are present. One stop criterion is suppressing the diagnosis in specific operating ranges of the internal combustion engine such as at high load ML and rpm (n). This procedure is, for example, then purposeful when the engine is driven in this operating range outside of the lambda=1 control. This state is noted in block 3.19 which then opens the switches 3.13 and 3.15. Opening of the switch 3.13 effects an interruption of the DKAT I formation and the opening of the switch 3.15 has the consequence of stopping a time measurement in the blocks 3.16 to 3.18. Here, the time measurement takes place with the purpose of permitting the threshold value comparison in block 3.11 by closure of switch 3.14 only after a predetermined diagnostic time span has elapsed. The diagnostic time span is not shortened by stop phases for open switches 3.13, 3.14. As a further stop criterion, the value of the quantity KATIN is used. If the quantity KATIN exceeds, for example, a pregiven maximum value, then, in some circumstances, a catalytic converter could not completely store the oxygen input per unit of time which is associated with a high KATIN value so that also rearward of the catalytic converter, oxygen could still be measured. To suppress a case of a catalytic converter overload which could possibly falsify the diagnostic result, the switches 3.13 and 3.15 are opened.

Stated otherwise, the integration or even summation of the difference does not take place when the catalytic converter does not operate in a compensating manner on the content of the oxygen in the exhaust gas.

This can then, for example, take place when the oxygen excess (or deficiency), which flows into the catalytic converter per unit of time, exceeds a pregiven maximum value.

The oxygen excess (or oxygen deficiency) flowing into the catalytic converter per unit of time can be formed as the product of the air quantity, which is inducted by the engine per unit of time, and the deviation of the actuating quantity of a mixture control loop from the neutral value corresponding to the stoichiometric mixture composition.

Furthermore, the integration does not take place when the oxygen fill level of the catalytic converter exceeds a pregiven maximum value or drops below a pregiven minimum value.

The pregiven maximum value should correspond to the maximum oxygen storage capacity of a catalytic converter which is just still operational.

The oxygen fill level of the catalytic converter can be formed via integration of the product of the air quantity, which is inducted per unit of time, and the deviation of the actuating variable of a mixture control loop from the neutral value corresponding to the stoichiometric mixture composition.

It is understood that the foregoing description is that of the preferred embodiments of the invention and that various changes and modifications may be made thereto without departing from the spirit and scope of the invention as defined in the appended claims.

What is claimed is:

1. A method for evaluating the operability of a catalytic converter mounted in the exhaust-gas system of an internal combustion engine utilizing an exhaust-gas probe mounted downstream of the catalytic converter and generating a signal having an amplitude defining an actual value, the method comprising the steps of:

detecting said actual value of said amplitude of said signal of said exhaust-gas probe mounted downstream of said catalytic converter;

forming an expectation value of said signal of said exhaust-gas probe from quantities measured upstream of said catalytic converter;

forming a measure for the deviation of said actual value from said expectation value; and, evaluating the operability of said catalytic converter on the basis of said measure.

2. The method of claim 1, comprising the further steps of:

comparing said measure to a pregiven threshold value; and, evaluating said catalytic converter to be inoperable when said measure exceeds said pregiven threshold value after a pregiven time span.

3. The method of claim 2, comprising the further steps of:

utilizing a quantity which is based on a signal of an exhaust-gas probe mounted forward of said catalytic converter as a first quantity of said quantities; and, utilizing a signal which is indicative of the mixture amount inducted by said engine wherein said signal defines a second one of said quantities.

4. The method of claim 3, comprising the further step of summing (integrating) sequentially occurring values of the difference of actual and expectation values as said measure.

5. The method of claim 4, wherein said step of summing is not executed when said catalytic converter does not operate in a compensating manner on the oxygen content in the exhaust gas.

6. The method of claim 5, wherein said step of summing is not executed when the oxygen fill level of said catalytic converter exceeds a pregiven maximum value or drops below a pregiven minimum value.

7. The method of claim 6, wherein said pregiven maximum value corresponds to the maximum oxygen storage capacity of a catalytic converter which is still just operational.

8. The method of claim 5, wherein said step of summing is not executed when the oxygen excess or oxygen deficiency, which flows into said catalytic converter per unit of time exceeds a pregiven maximum value.

9. The method of claim 8, wherein said internal combustion engine includes a mixture control loop having an actuating variable; and, the oxygen excess or oxygen deficiency, which flows into said catalytic converter per unit of time, is formed as a product of the amount of air, which is inducted by said engine per unit of time, and the deviation of said actuating variable of said mixture control loop from a neutral value corresponding to the stoichiometric mixture composition.

10. The method of claim 7, wherein said internal combustion engine includes a mixture control loop having an actuating variable; and, the oxygen fill level of said catalytic converter is formed by integrating th e product of the air quantity, which is inducted per unit of time, and the deviation of said actuating variable of said mixture control loop from the neutral value corresponding to a stoichiometric mixture composition.

11. The method of claim 1, wherein said expectation value is formed in dependence upon a modeled catalytic converter fill level on the basis of a hypothesis for the state of the catalytic converter.

12. The method of claim 11, wherein said quantities measured upstream of said catalytic converter represent the oxygen input into said catalytic converter.

13. The method of claim 1, wherein said quantities measured upstream of said catalytic converter represent the oxygen input into said catalytic converter.

* * * * *